United States Patent
Park

(10) Patent No.: US 10,057,171 B2
(45) Date of Patent: Aug. 21, 2018

(54) APPARATUS AND METHOD FOR CONTROLLING VEHICLE COMMUNICATION

(71) Applicant: MANDO CORPORATION, Pyeongtaek-si (KR)

(72) Inventor: Man Bok Park, Seoul (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 321 days.

(21) Appl. No.: 14/801,681

(22) Filed: Jul. 16, 2015

(65) Prior Publication Data

US 2016/0021008 A1 Jan. 21, 2016

(30) Foreign Application Priority Data

Jul. 17, 2014 (KR) .................. 10-2014-0090137

(51) Int. Cl.
| | | |
|---|---|---|
| *H04L 12/801* | (2013.01) | |
| *H04W 28/02* | (2009.01) | |
| *H04W 52/34* | (2009.01) | |

(52) U.S. Cl.
CPC .............. *H04L 47/12* (2013.01); *H04L 47/11* (2013.01); *H04W 28/02* (2013.01); *H04W 52/343* (2013.01)

(58) Field of Classification Search
CPC ... H04L 47/10–47/127; H04W 52/343; H04W 28/02
See application file for complete search history.

(56) References Cited

U.S. PATENT DOCUMENTS

| 8,055,279 B2 | 11/2011 | Murakami | |
|---|---|---|---|
| 2009/0279499 A1* | 11/2009 | Machida | H04W 72/0486 370/330 |

(Continued)

FOREIGN PATENT DOCUMENTS

| CN | 101611434 | 12/2009 |
|---|---|---|
| CN | 101882381 | 11/2010 |

(Continued)

OTHER PUBLICATIONS

Office Action dated Jul. 20, 2017 for Chinese Patent Application No. 201510423207.4 and its English machine translation by Global Dossier.

*Primary Examiner* — Paul H Masur

(74) *Attorney, Agent, or Firm* — Ladas & Parry, LLP

(57) ABSTRACT

A method and apparatus for determining congestion of vehicle communication control the vehicle communication, thereby reducing a degree of congestion. In detail, provided are an apparatus and method for controlling vehicle communication, the apparatus including: a reception unit for receiving data units transmitted by each of one or more of object terminals and one or more of pieces of congestion information of the object terminals; a congestion degree pre-determination unit for changing congestion information of a subject vehicle on the basis of the number of data units received during a predetermined period of time; a congestion determination unit for changing electric power control information on the basis of the congestion information of the subject vehicle or the congestion information of the object terminals; and an electric power control unit for controlling transmission electric power of a communication module on the basis of the electric power control information.

9 Claims, 9 Drawing Sheets

(56) References Cited

U.S. PATENT DOCUMENTS

| | | | | |
|---|---|---|---|---|
| 2010/0049819 | A1* | 2/2010 | Hamada | G08G 1/161 |
| | | | | 709/207 |
| 2011/0009151 | A1* | 1/2011 | Miucic | H04L 1/0006 |
| | | | | 455/522 |
| 2013/0103781 | A1 | 4/2013 | Mori et al. | |
| 2013/0190025 | A1* | 7/2013 | Sakata | H04W 52/243 |
| | | | | 455/501 |
| 2013/0329651 | A1* | 12/2013 | Lee | H04W 52/04 |
| | | | | 370/329 |
| 2014/0379250 | A1* | 12/2014 | Noh | G08G 1/161 |
| | | | | 701/408 |
| 2015/0036487 | A1* | 2/2015 | Sakata | H04W 28/0284 |
| | | | | 370/229 |
| 2015/0207745 | A1* | 7/2015 | Funabashi | H04L 47/27 |
| | | | | 370/235 |
| 2015/0281023 | A1* | 10/2015 | Funabashi | H04L 43/0817 |
| | | | | 370/242 |
| 2017/0034667 | A1* | 2/2017 | Kumabe | H04W 4/04 |

FOREIGN PATENT DOCUMENTS

| | | |
|---|---|---|
| CN | 102577556 | 7/2012 |
| CN | 103299340 | 9/2013 |
| CN | 103491617 | 1/2014 |

\* cited by examiner

APPARATUS AND METHOD FOR CONTROLLING VEHICLE COMMUNICATION

CROSS-REFERENCE TO RELATED APPLICATION

This application claims priority from and the benefit under 35 U.S.C. § 119(a) of Korean Patent Application No. 10-2014-0090137, filed on Jul. 17, 2014, which is hereby incorporated by reference for all purposes as if fully set forth herein.

BACKGROUND OF THE INVENTION

1. Field of the Invention

The present invention relates to a technology of controlling vehicle communication and, more particularly, to a method and apparatus for determining congestion of vehicle communication to control the vehicle communication, thereby reducing a degree of congestion.

2. Description of the Prior Art

In recent years, with development of Vehicle-to-Vehicle (V2V) communication or Vehicle-to-Infrastructure (V2I) communication, technologies of transmitting/receiving various types of information between vehicles or between a vehicle and an infrastructure and using the information for driving of a vehicle are proposed.

Such V2V communication or V2I communication is commonly called Vehicle-to-Everything (V2X) communication, and it is predicted that a time when all vehicles have such a V2X communication function will come in the future.

Meanwhile, with propagation of the V2X communication, the number of vehicles and infrastructure devices which can perform communication has increased. Such an increase in the number of vehicles and infrastructure devices necessarily causes an increase in a degree of communication congestion within a predetermined range. That is, when an amount of communication data of vehicles or infrastructure devices increases within a predetermined range, the entirety or a part of the data may be omitted/lost. For example, a large amount of data may be received as compared with a communication capacity with which a specific vehicle can receive data, and when an amount of data, larger than a capacity which a vehicle can process, is received, some pieces of data may be lost or omitted. Thus, it may be difficult to efficiently perform an operation thereof.

Further, when data omission frequently occurs due to the increase in the degree of communication congestion, the degree of communication congestion may be further increased due to retransmission of data. Thus, data transmission may be exponentially increased, and it is possible to cause communication problems of other surrounding vehicles.

SUMMARY OF THE INVENTION

In this background, an aspect of the present invention is to provide a method and apparatus of determining a degree of congestion in V2X communication between vehicles, and adjusting transmission electric power of a subject vehicle on the basis of the degree of congestion.

Another aspect of the present invention is to provide a method and apparatus for efficiently reducing a degree of communication congestion within a predetermined range by sharing the degree of communication congestion with another vehicle.

In order to achieve the above-described aspect, in accordance with an embodiment of the present invention, an apparatus for controlling vehicle communication is provided. The apparatus includes: a reception unit of receiving data units transmitted from one or more of object terminals and one or more of pieces of congestion information of the object terminals; a congestion degree pre-determination unit for changing congestion information of a subject vehicle on the basis of the number of data units received during a predetermined period of time; a congestion degree determination unit for changing electric power control information on the basis of the congestion information of the subject vehicle or the congestion information of the object terminals; and an electric power control unit for controlling transmission electric power of a communication module on the basis of the electric power control information.

In accordance with another embodiment of the present invention, a method of controlling vehicle communication is provided. The method includes: a reception step of receiving data units transmitted from one or more of object terminals and one or more of pieces of congestion information of the object terminals; a congestion degree pre-determination step of changing congestion information of a subject vehicle on the basis of the number of data units received during a predetermined period of time; a congestion degree determination step of changing electric power control information on the basis of the congestion information of the subject vehicle or the congestion information of the object terminals; and an electric power control step of controlling transmission electric power of a communication module on the basis of the electric power control information.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, some embodiments of the present invention will be described with reference to the accompanying drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
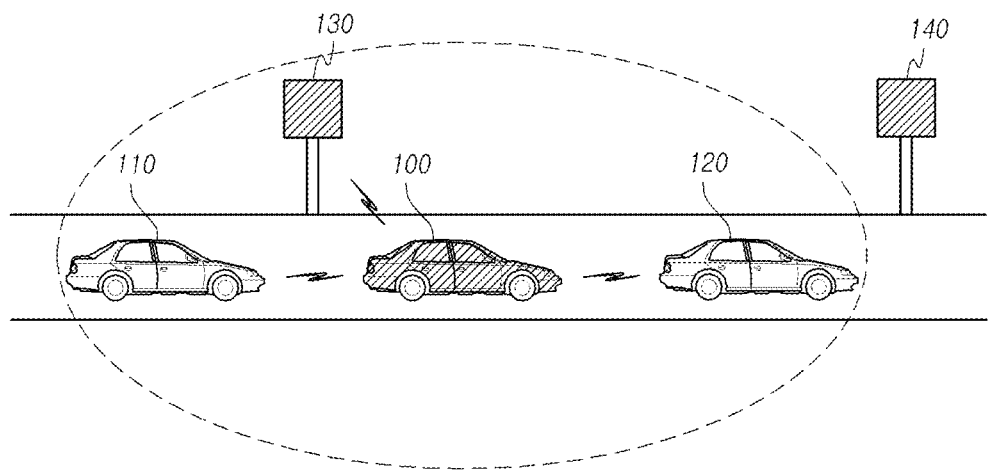
FIG. 1 is an exemplary view for describing a vehicle communication concept to which the present invention can be applied.

FIG. 1 is an exemplary view for describing a vehicle communication concept to which the present invention can be applied.

Referring to FIG. 1, a vehicle 100 can communicate with other vehicles 110 and 120 and an infrastructure device 130. In this case, the vehicle 100 can communicate with the other vehicles 110 and 120 within a communicable range and can communicate with the infrastructure device 130. The vehicle 100 cannot communicate with an infrastructure 140 or a vehicle, which is located outside a communicable range thereof. However, when the infrastructure device 140 enters the communicable range of the vehicle 100 while the vehicle 100 is driven, the vehicle 100 and the infrastructure device 140 can communicate with each other.

Communication between vehicles and communication between a vehicle and an infrastructure device are commonly called V2X communication. An example of schemes of the V2X communication is a Wireless Access in Vehicular Environment (WAVE) using a communication frequency of 5.9 GHz, as a form of a multi hop network, but the present invention is not limited thereto. That is, the existing wireless communication protocol or a new wireless communication protocol may be used for the V2X communication.

The vehicle can exchange a large number of pieces of information on a current location, a current speed, a dangerous situation, etc. of the vehicle, with a surrounding vehicle or infrastructure device. As a result, the vehicle can perform various functions, such as following travel or detection of a dangerous situation outside a driver's sight, which can improve safety and convenience, on the basis of various pieces of received information.

However, when the number of vehicles and infrastructure devices which can perform V2X communication is rapidly increased, an amount of data may be rapidly increased. Thus, loss or omission of the data may occur due to characteristics of wireless communication using limited wireless resources.

In order to solve the above-described problem, a method of controlling communication transmission electric power of a vehicle according to the present invention will be described in detail with reference to the accompanying drawings.

Figure 2:
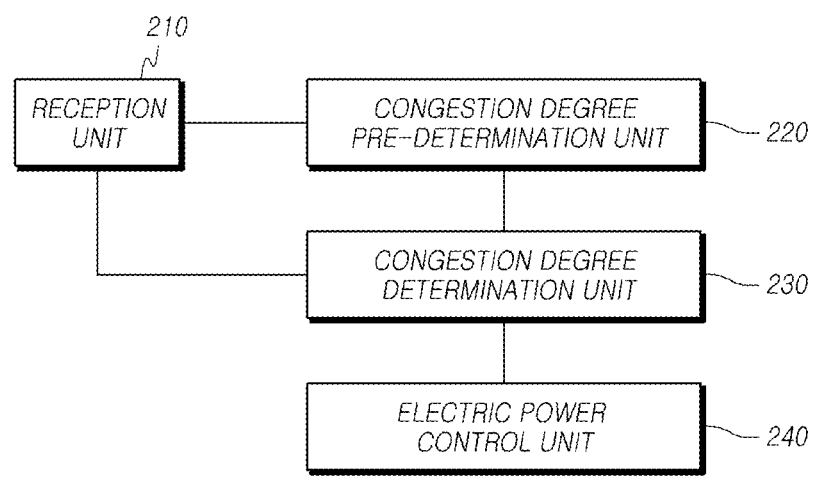
FIG. 2 is a block diagram schematically illustrating a configuration of an apparatus for controlling vehicle communication according to an embodiment of the present invention.

FIG. 2 is a block diagram schematically illustrating a configuration of an apparatus for controlling vehicle communication according to an embodiment of the present invention.

An apparatus of controlling vehicle communication according to an embodiment of the present invention may include: a reception unit 210 for receiving data units transmitted by each of one or more of object terminals and one or more of pieces of congestion information of the object terminals; a congestion degree pre-determination unit 220 for changing congestion information of a subject vehicle on the basis of the number of data units received during a predetermined period of time; a congestion determination unit 230 for changing electric power control information on the basis of the congestion information of the subject vehicle or the congestion information of the object terminals; and an electric power control unit 240 for controlling transmission electric power of a communication module on the basis of the electric power control information.

Referring to FIG. 2, the reception unit 210 of the apparatus of controlling vehicle communication may receive the one or more of data units transmitted from each of the object terminals and the congestion information of the object terminals. The reception unit 210 may be a communication module configured in a vehicle and may receive information received through an antenna, etc., through internal communication. The received data unit may include information on the aforementioned speed of a surrounding vehicle, etc. and may be received in a packet form. Meanwhile, the congestion information of the object terminals may be information transmitted when congestion information of a surrounding vehicle or an infrastructure device is changed. Further, the reception unit 210 may further receive electric power control information of the object terminals. Likewise, the electric power control information of the object terminals may be transmitted when the corresponding electric power control information has an activation value.

The congestion degree pre-determination unit 220 can change the congestion information of the subject vehicle on the basis of the number of received data units. For example, the congestion degree pre-determination unit 220 can compare the number of data units received during a predetermined period of time with a reference value, and change the congestion information of the subject vehicle to activation or deactivation according to the compared result. Pieces of information, such as an index value, a count value, activation information, flag information, etc., which can distinguish two or more modes, are commonly called the congestion information in the present specification. Hereinafter, for the convenience of understanding, it is exemplified that the congestion information is configured to be an activation mode or a deactivation mode.

The congestion degree determination unit 230 can change and configure the electric power control information to be activation or deactivation on the basis of the congestion information of the subject vehicle, which is configured by the congestion degree pre-determination unit 220, or the congestion information of the object terminals, which is acquired through the reception unit 210.

As an example, the congestion degree determination unit 230 can add the number of pieces of the congestion information of the subject vehicle and the number of pieces of the congestion information of the object terminals, compare the total number with a predetermined reference value, and configure the electric power control information according to the compared result.

As another example, the congestion degree determination unit 230 can compare the number of pieces of congestion information having an activation state value from among the congestion information received from the object terminals with a predetermined reference value, and change the electric power control information to an activation state when the corresponding number exceeds a predetermined reference value.

The electric power control unit 240 can control transmission electric power of a communication module on the basis of the electric power control information. When the transmission electric power increases, reachable range of data transmitted by a vehicle may increase, and when the transmission electric power decreases, the reachable range of data transmitted by a vehicle may decrease. That is, the reachable range of data may be changed through controlling the transmission electric power.

Figure 3:
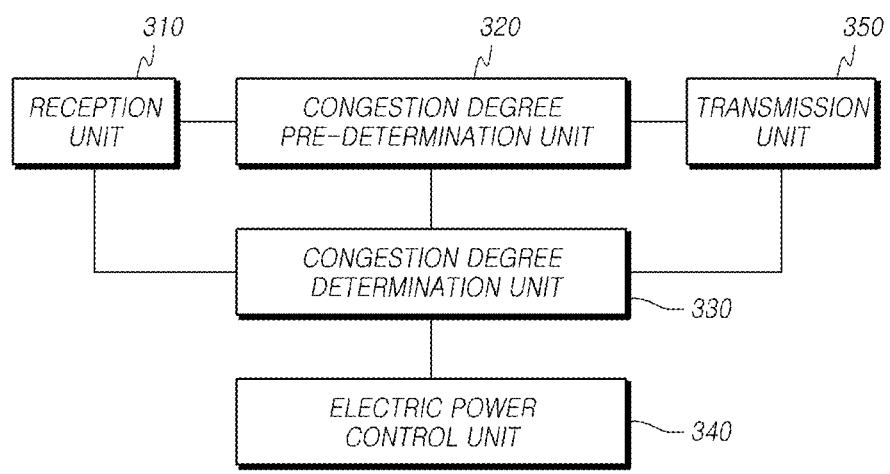
FIG. 3 is a block diagram schematically illustrating a configuration of an apparatus for controlling vehicle communication according to another embodiment of the present invention.

FIG. 3 is a block diagram schematically illustrating a configuration of an apparatus for controlling vehicle communication according to another embodiment of the present invention.

The apparatus for controlling vehicle communication according to another embodiment of the present invention may further comprise a transmission unit 350 for, when one or more of values of the congestion information of the subject vehicle and the electric power control information are changed, transmitting the changed congestion information or the changed electric power control information of the subject vehicle.

Referring to FIG. 3, the reception unit 310 can receive one or more of data units and one or more of pieces of the congestion information of the object terminals. Further, the congestion degree pre-determination unit 320 can configure the congestion information of the subject vehicle on the basis of the number of received data units, and the congestion degree determination unit 330 can configure the electric power control information on the basis of the congestion information of the subject vehicle or the congestion information of the object terminals.

Meanwhile, the transmission unit 350 can transmit, to the object terminals, the congestion information or the electric power control information of the subject vehicle, which is configured by the congestion degree pre-determination unit 320 and the congestion degree determination unit 330. For example, the transmission unit 350 can transmit, to the object terminals, the congestion information of the subject vehicle, which includes activation information, when the congestion information of the subject vehicle is changed from a deactivation state to an activation state. Further, the transmission unit 350 can transmit, to the object terminals, the electric power control information including the activation information when the electric power control information is changed from a deactivation state to an activation state. Further, the transmission unit 350 may serve to transmit a data unit.

As another example, the transmission unit 350 can transmit the congestion information of the subject vehicle and the electric power control information, which include deactivation information, even when the congestion information or the electric power control information of the subject vehicle is changed from an activation state to a deactivation state.

As a result, when the congestion information of the subject vehicle and the electric power control information are changed, the transmission unit 350 can transmit the congestion information of the subject vehicle and the electric power control information, which include the corresponding changed contents. From the viewpoint of the object terminals, the congestion information or the electric power control information of the subject vehicle, which is transmitted by the transmission unit 350, can be received as the congestion information of the object terminals or the electric power control information of the object terminals, and may be used to determine a congestion degree as described above.

Meanwhile, one or more of object terminals may imply a surrounding vehicle or an infrastructure device which performs V2X communication. For example, the object terminals may be a surrounding vehicle which performs communication with the subject vehicle through the V2X communication or may imply an infrastructure device which may be installed a roadside of a road.

Figure 4:
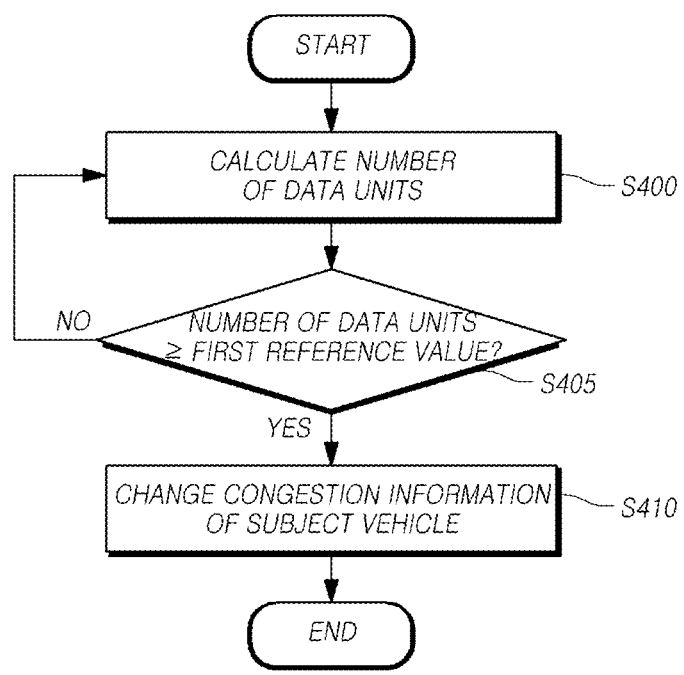
FIG. 4 is a flowchart illustrating an operation of a congestion degree pre-determination unit according to yet another embodiment of the present invention.

FIG. 4 is a flowchart illustrating an operation of a congestion degree pre-determination unit according to yet another embodiment of the present invention.

The congestion degree pre-determination unit can calculate the number of data units received during a predetermined period of time or an average value obtained by averaging the number of data units received in a predetermined time unit over a predetermined period of time, and change the congestion information of the subject vehicle to an activation state when it is determined that the calculated number of data units or the average value is equal to or larger than a first reference value.

Referring to FIG. 4, the congestion degree pre-determination unit can change the congestion information of the subject vehicle on the basis of the number of received data units. The data unit may imply a data packet or may imply a data unit divided according to a specific standard.

The congestion degree pre-determination unit can calculate the number of data units received during a predetermined period of time (S400). For example, the congestion degree pre-determination unit can calculate the total number of data units received during a predetermined period of time by counting the data units received during a predetermined constant period of time. As another example, the congestion degree pre-determination unit can calculate the number of data units received in a predetermined time unit, and calculate an average value by averaging the calculated number of data units. In detail, when 1 second is configured as a predetermined time unit and 5 seconds are configured as a predetermined period of time, when the numbers of data units received at every second correspond to 10, 20, 30, 20, and 50, respectively, the congestion degree pre-determination unit can calculate the total number of data units received for 5 seconds to be 130, and calculate an average value to be 26 which is obtained by dividing 130 by 5. Hereinafter, although an operation of the congestion degree pre-determination unit will be described with regard to the total number, the operation can be identically performed even when an average value is used.

The congestion degree pre-determination unit can compare the calculated number of data units with a first reference value (S405). The first reference value can be configured in advance.

When it is determined that the number of data units is equal to or larger than the first reference value, the congestion degree pre-determination unit can change the congestion information of the subject vehicle to an activation state (S410). When the number of data units is smaller than the first reference value (NO in S405), the congestion degree pre-determination unit can repeatedly calculate the number of data units received during the predetermined constant period of time.

Figure 5:
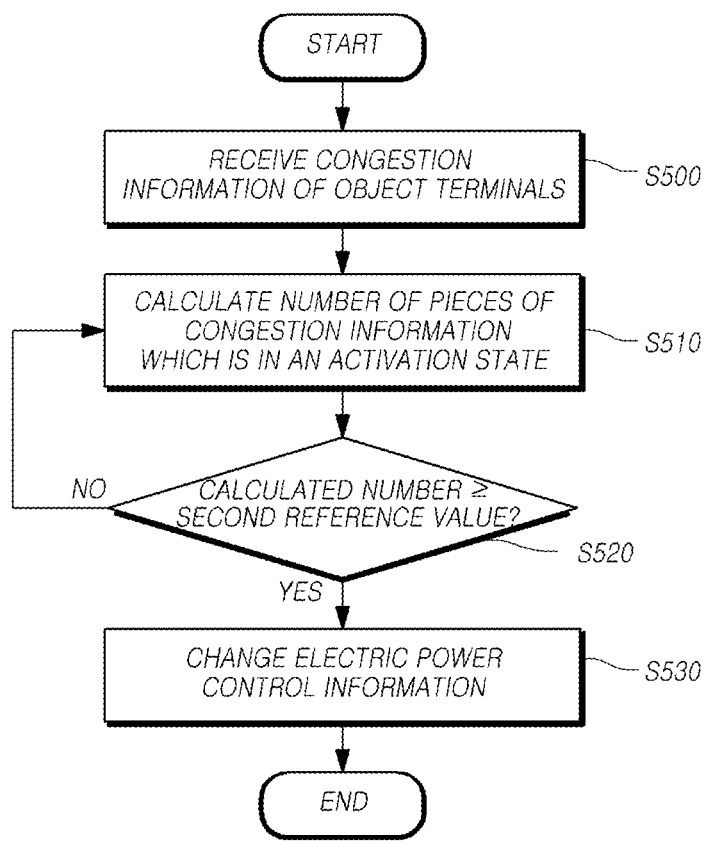
FIG. 5 is a flowchart illustrating an operation of a congestion degree determination unit according to yet another embodiment of the present invention.

FIG. 5 is a flowchart illustrating an operation of a congestion degree determination unit according to yet another embodiment of the present invention.

The congestion degree determination unit according to yet another embodiment of the present invention can calculate the total number of pieces of congestion information having an activation state value from among one or more of pieces of the congestion information of the object terminals, and can change the electric power control information to an activation state when it is determined that the calculated total number is equal to or larger than a second reference value.

Referring to FIG. 5, the congestion degree determination unit can receive the congestion information of the object terminals, which is received by the reception unit. The congestion information of the object terminals may be received from the reception unit through an internal communication protocol. Further, the congestion degree determination unit can receive the congestion information of the subject vehicle from the congestion degree pre-determination unit.

The congestion degree determination unit can change the electric power control information on the basis of the congestion information of the object terminals of the congestion information of the subject vehicle, which is described above.

As an example, the congestion degree determination unit can calculate the number of pieces of congestion information having an activation state value from among pieces of the congestion information of the object terminals, which are received during a predetermined period of time (S510). As another example, the congestion degree determination unit can calculate the number by adding the number of pieces of the congestion information of the subject vehicle having an activation state value to the number of pieces of the congestion information having an activation state value from among pieces of the congestion information of the object terminals.

Thereafter, the congestion degree determination unit compares the calculated number with a predetermined second reference value (S520). When it is determined that the calculated number is equal to or larger than the second reference value (YES in S520), the congestion degree determination unit can change the electric power control information to an activation state (S530). When it is determined that the calculated number is smaller than the second reference value (NO in S520), the congestion degree determination unit can repeatedly calculate the number (S510).

As an example, when it is determined that the number of received data units is equal to or larger than the first reference value, so that the congestion information of the subject vehicle is configured to be an activation state, and three pieces of the congestion information of the object terminals, which are received from surrounding vehicles, are configured to be an activation state, the congestion degree determination unit can calculate the number of pieces of the congestion information, which are in an activation state to be 3 or 4. When the predetermined second reference value is 2, since the calculated number, which is 3 or 4, is equal to or larger than 2, the congestion degree determination unit can change the electric power control information to an activation state. In calculation of the number used for changing the electric power control information, whether the congestion information of the subject vehicle is included or not may be configured in advance.

As another example, when the number of received data units is smaller than the first reference value, in a case where the congestion information of the subject vehicle is a deactivation state, but the number of pieces of the congestion information of the object terminals, which correspond to an activation state, is 2, the congestion degree determination unit can calculate the number of pieces of the congestion information, which correspond to an activation state, to be 2. When the predetermined second reference value is 2, since the calculated number is equal to 2, the congestion degree determination unit can change the electric power control information to an activation state.

Thus, the apparatus of controlling vehicle communication according to the present invention can control the transmission electric power according to a congestion degree of a surrounding vehicle or an infrastructure device even when data units of a vehicle are normally received, thereby reducing the congestion degree of the surrounding vehicle or the infrastructure device.

As yet another example, the congestion degree determination unit can perform the determination by giving a weighted value to the congestion information of the object terminals. For example, when the congestion information of the subject vehicle is activation, the number may be counted by 1, and when the congestion information of the object terminals is activation, the number may be counted by 2 by applying a weighted value. That is, when one piece of the congestion information of the subject vehicle, which is an activation state, and one piece of the congestion information of the object terminals, which is an activation state, are received, the congestion degree determination unit may calculate the number to be 1+2 by applying the weighted value, and change the electric power control information by comparing the number calculated to be 3 with the second reference value. As a result, the present invention can efficiently reduce a congestion degree of a surrounding vehicle.

Figure 6:
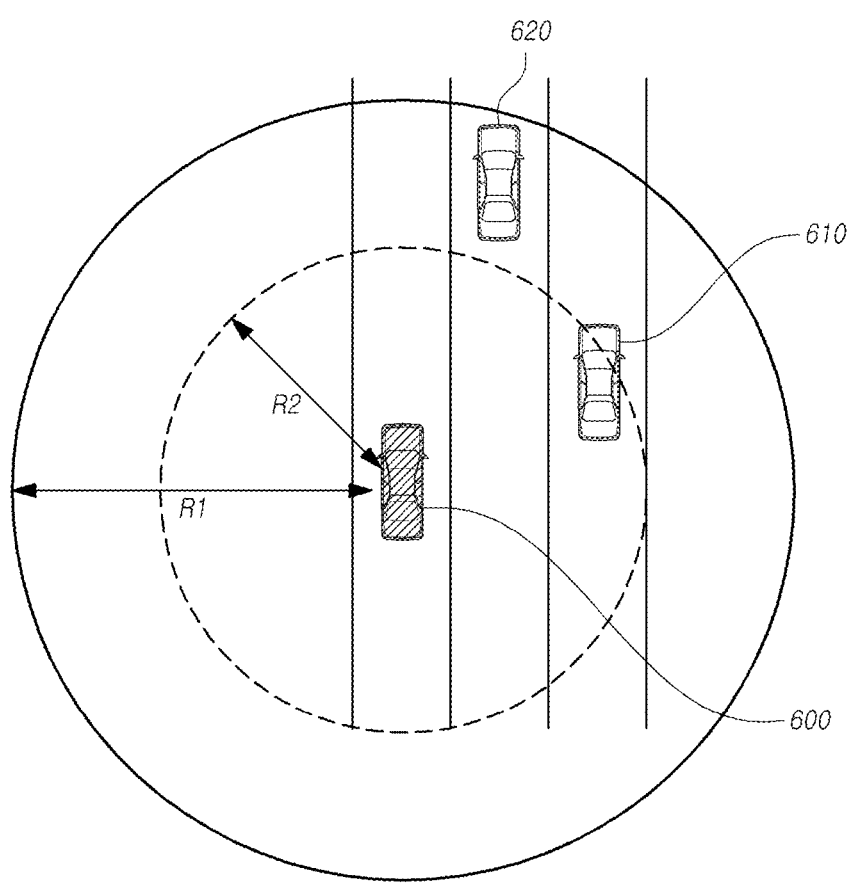
FIG. 6 is a view for describing a change in a communication distance through a transmission electric power control according to yet another embodiment of the present invention.

FIG. 6 is a view for describing a change in a communication distance through a transmission electric power control according to yet another embodiment of the present invention.

An electric power control unit according to yet another embodiment of the present invention can make a control to reduce transmission electric power when the electric power control information is an activation state.

Referring to FIG. 6, a vehicle 600 according to the present invention can control transmission electric power of a communication module on the basis of the electric power control information as described above. For example, the vehicle can perform V2X communication with surrounding vehicles 610 and 620. In this case, the vehicle 600 can configure the electric power control information to be activated through the above-described operations when an amount of data communication increases and an amount of data communication of the surrounding vehicles increases. The electric power control unit can reduce a data transmission radius from R1 to R2 when the electric power control information is configured to be activated. To this end, the electric power control unit can make a control to reduce the transmission electric power of the communication module. For example, the electric power control unit can control the transmission electric power of the communication module by adjusting a transmission current or voltage value.

As another example, the electric power control unit can increase or decrease the transmission electric power stage by stage when controlling the transmission electric power on the basis of the electric power control information. In detail, when the electric power control information is configured in various stages, the electric power control unit can increase or decrease the transmission electric power to correspond to each stage. That is, when 3 stages of electric power control information are configured, the electric power control unit can configure three stages of transmission electric power control stages such that a communication radius is sequentially increased or decreased and make a control to configure the transmission electric power to correspond to the stage of the electric power control information.

As yet another example, when there is an object terminal being communicating with the subject terminal, the electric power control unit can make a control to reduce the transmission electric power within a range in which communication with the object terminal is maintained. As a result, even when the transmission electric power of the communication module is reduced, the subject vehicle being communicating with a specific one object terminal can reduce the transmission electric power even while preventing unexpected communication disconnection, thereby reducing a data load of the entirety of the system.

Figure 7:
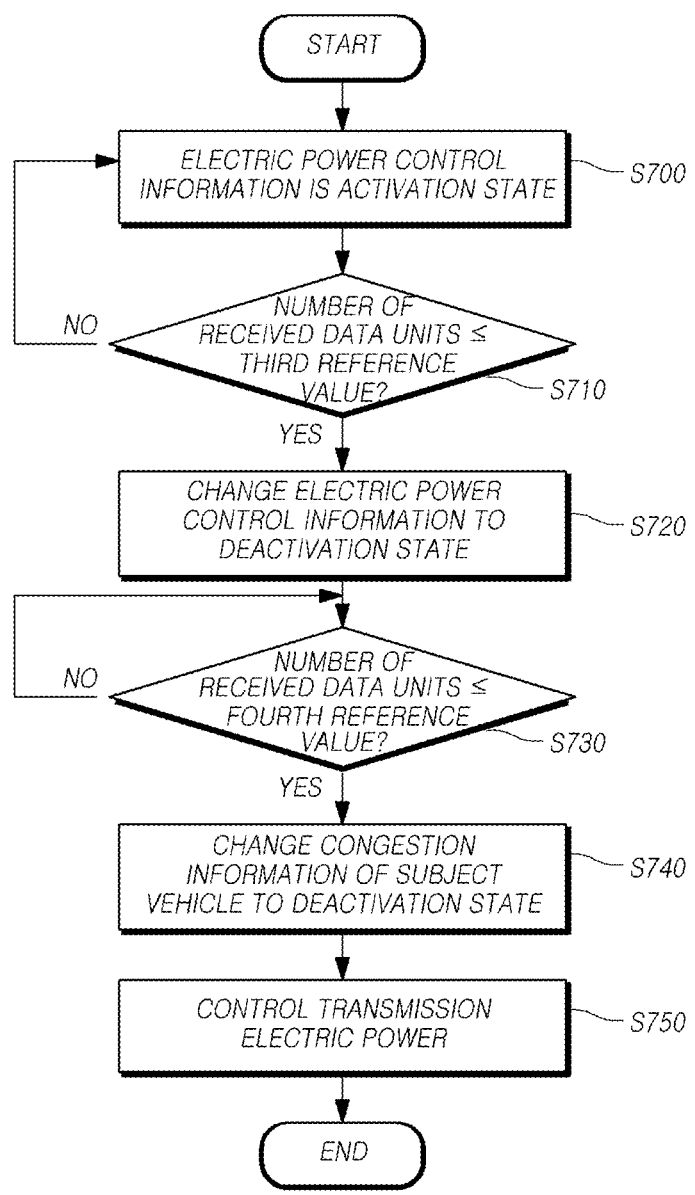
FIG. 7 is a flowchart illustrating a process of controlling transmission electric power according to a reception data unit by a congestion degree pre-determination unit and a congestion degree determination unit according to yet another embodiment of the present invention.

FIG. 7 is a flowchart illustrating a process of controlling transmission electric power according to a reception data unit by a congestion degree pre-determination unit and a congestion degree determination unit according to yet another embodiment of the present invention.

An apparatus for controlling vehicle communication according to yet another embodiment of the present invention can change the congestion information or the electric power control information of the subject vehicle on the basis of the received data units. Hereinabove, a case where each piece of the congestion information or the electric power control information is changed to a activation state has been described, and FIG. 7 illustrates a case where the congestion information or the electric power control information, which is in an activation state, is changed to a deactivation state.

A congestion degree determination unit according to yet another embodiment of the present invention can change the electric power control information to a deactivation state when the electric power control information is an activation state and it is determined that the number of data units received during a predetermined period of time is smaller than a third reference value.

Further, a congestion degree pre-determination unit according to yet another embodiment of the present invention can change the congestion information of the subject vehicle to a deactivation state when the congestion information of the subject vehicle is an activation state and it is determined that the number of data units received during a predetermined period of time is smaller than a fourth reference value.

Referring to FIG. 7, the apparatus for controlling vehicle communication can change the electric power control information or the congestion information of the subject vehicle, which is in an activation state, to a deactivation state on the basis of the number of received data units. As a result, the apparatus for controlling vehicle communication can decrease the transmission electric power when the number of data units is increased or a data congestion degree of a surrounding vehicle is increased and increase the transmission electric power when the number of data units is decreased, so that the transmission electric power may return to an original state thereof. That is, the apparatus for controlling vehicle communication according to the present invention can fluidly control the transmission electric power by comprehensively considering the data reception degree of the subject vehicle and the congestion degrees of a surrounding vehicle and an infrastructure device.

In detail, when the electric power control information is configured to be an activation state (S700), the congestion degree determination unit can compare the number of received data units with the third reference value (S710). When it is determined that the number of received data units is equal to or smaller than the third reference value (YES in S710), the congestion degree determination unit can change the electric power control information to a deactivation state (S720). Meanwhile, when it is determined that the number of internal reception data units is larger than the third reference value (NO in S710), the congestion degree determination unit maintains the electric power control information to be an activation state (S700).

The congestion degree pre-determination unit can compare the number of received data units with the fourth reference value when the congestion information of the subject vehicle is in an activation state (S730). When it is determined that the number of received data units is equal to or smaller than the fourth reference value (YES in S730), the congestion degree pre-determination unit can change the congestion information of the subject vehicle to a deactivation state (S740). Meanwhile, when it is determined that the number of internal reception data units is larger than the third reference value (NO in S710), the congestion degree pre-determination unit maintains the congestion information of the subject vehicle to be an activation state.

Meanwhile, when the congestion information of the subject vehicle is changed to a deactivation state (S740), the electric power control unit can make a control to increase the transmission electric power. As described above, the electric power control unit can control the transmission electric power stage by stage in various stages. Further, the electric power control unit can determine whether the subject vehicle communicates with the object terminals, and make a control to reduce the transmission electric power within a range in which communication with the object terminals is not terminated. That is, the electric power control unit can determine a reduction range of the transmission electric power on the basis of distance information of the subject vehicle such that the object terminals receives transmission data of the subject vehicle even when the transmission electric power is reduced.

The above-described fourth reference value can be preconfigured to be a value smaller than the third reference value. Thus, the apparatus for controlling vehicle communication makes a control to reduce the transmission electric power, and then may sequentially change the electric power control information to a deactivation state according to the number of received data units.

The transmission unit described in FIG. 3 can transmit the congestion information of the subject vehicle or the electric power control information when the congestion information of the subject vehicle or the electric power control information is changed.

Meanwhile, the above-described first to third reference values may be equally or differently configured.

Figure 8B:
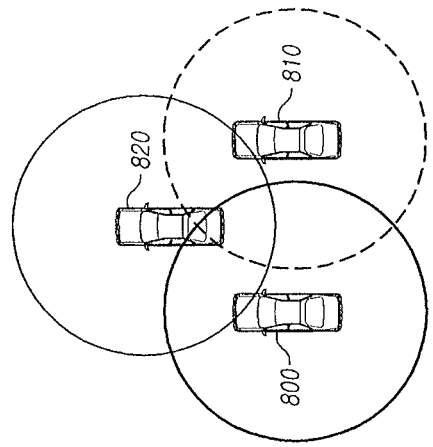
FIGS. 8A and 8B illustrate effects according to an operation of an apparatus for controlling vehicle communication according to yet another embodiment of the present invention.
Figure 8A:
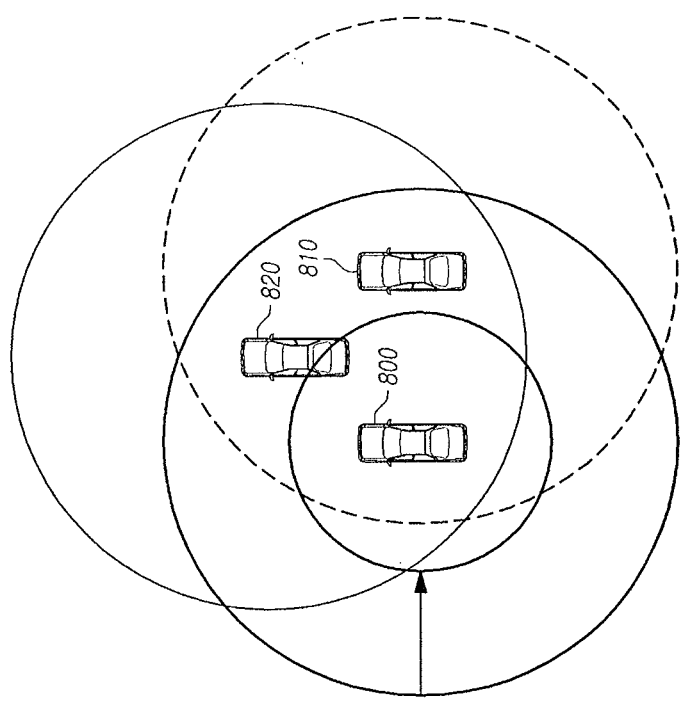

FIGS. 8A and 8B illustrate effects according to an operation of an apparatus for controlling vehicle communication according to yet another embodiment of the present invention.

As described above, the apparatus for controlling vehicle communication according to the present invention can control the transmission electric power by considering information on the congestion degrees of a surrounding vehicle and an infrastructure device as well as the subject vehicle.

FIG. 8A illustrates a data transmission range of a subject vehicle 800 and surrounding vehicles 810 and 820. When the subject vehicle 800 receives a plurality of pieces of data from the surrounding vehicles 810 and 820, the number of data units of the subject vehicle 800 increases. In this case, when transmission electric power is controlled on the basis of an amount of received data of the subject vehicle 800, a transmission range of the subject vehicle 800 is reduced. However, even when the transmission range of the subject vehicle is reduced, transmission ranges of the surrounding vehicles 810 and 820 are not reduced, and the received data of the subject vehicle 800 is continuously maintained, so that a problem that loss or omission occurs may not be solved.

In order to solve the above-described problem, the present invention performs a process of determining a congestion degree, in two stages of a congestion degree pre-determination unit and a congestion degree determination unit.

Referring to FIG. 8B, when the subject vehicle 800 receives a plurality of pieces of data from the surrounding vehicles 810 and 820, the number of data units of the subject vehicle 800 increases. In this case, the congestion degree pre-determination unit compares the number of received data units with a reference value, and changes congestion information of the subject vehicle to an activation state when it is determined that the number of received data units is equal to or larger than the reference value.

Meanwhile, a reception unit can receive congestion information of object terminals from the surrounding vehicles 810 and 820. Thus, when congestion information of the object terminals, which corresponds to an activation state, is not received from the surrounding vehicles 810 and 820, transmission electric power of the subject vehicle 800 can be continuously maintained. When the congestion information of the object terminals, which corresponds to an activation state, is received from the surrounding vehicles 810 and 820, the congestion degree determination unit compares the received congestion information of the object terminals corresponding to an activation state with a reference value, and changes electric power control information to an activation state according to the compared result. An electric power control unit can make a control to reduce the transmission electric power on the basis of the changed electric power control information.

Thus, the apparatus for controlling vehicle communication according to the present invention can reduce the transmission electric power by considering the congestion degrees of the surrounding vehicles 810 and 820, and accordingly, reduce the congestion degrees of the surrounding vehicles 810 and 820.

Likewise, when the congestion information of the subject vehicle 800 is changed to an activation state, a transmission unit can transmit the congestion information of the subject vehicle corresponding to an activation state to the surrounding vehicles 810 and 820. The surrounding vehicles 810 and 820 can reduce transmission electric power thereof on the basis of the congestion information of the subject vehicle. As a result, the number of data units received by the subject vehicle 800 can be reduced.

That is, as illustrated in FIG. 8B, when a communication congestion degree is increased, the transmission electric power of the surrounding vehicles 810 and 820 as well as the subject vehicle 800 is reduced, so that a data transmission radius is reduced. Thus, a congestion situation can be efficiently improved. Such an effect cannot be expected when the transmission electric power is controlled only using the information on the received data units as illustrated in FIG. 8A, but can be provided only when the congestion information of the surrounding vehicles or the electric power control information is received as in the present invention.

Figure 9:
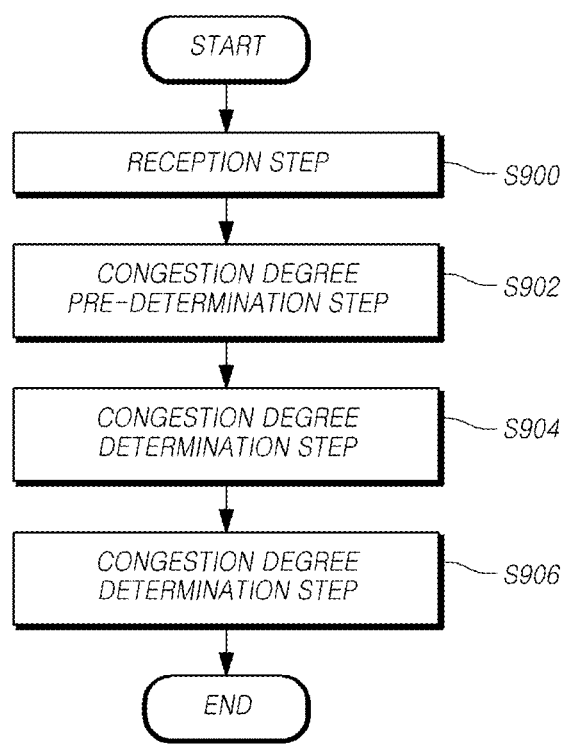
FIG. 9 is a flowchart illustrating a method of controlling vehicle communication according to yet another embodiment of the present invention.

FIG. 9 is a flowchart illustrating a method of controlling vehicle communication according to yet another embodiment of the present invention.

A method of controlling vehicle communication according to yet another embodiment of the present invention may include: a reception step of receiving data units transmitted from one or more of object terminals and one or more of pieces of congestion information of the object terminals; a congestion degree pre-determination step of changing congestion information of a subject vehicle on the basis of the number of data units received during a predetermined period of time; a congestion degree determination step of changing electric power control information on the basis of the congestion information of the subject vehicle or the congestion information of the object terminals; and an electric power control step of controlling transmission electric power of a communication module on the basis of the electric power control information.

Referring to FIG. 9, the reception step can receive the data unit transmitted from one or more of the object terminals and the congestion information of the object terminals (S900). The object terminals may imply a surrounding vehicle or an infrastructure device which performs V2X communication.

The congestion degree pre-determination step can change the congestion information of the subject vehicle in the basis of data units received during a predetermined period of time (S902). That is, the total number of data units received during a predetermined period of time is compared with a reference value, and when the total number is equal to or larger than the reference value, the congestion information of the subject vehicle is changed to an activation state. As another example, an average value obtained by averaging the number of data units received in a predetermined time unit over a predetermined time period may be compared with a reference value.

The congestion degree determination step can change the electric power control information on the basis of the congestion information of the subject vehicle or the congestion information of the object terminals (S904). For example, pieces of the congestion information of the subject vehicle or the congestion information of the object terminals, which correspond to an activation state, are counted, and the counted value and a reference value can be compared with each other. When it is determined that the counted value is equal to or larger than the reference value, the electric power control information may be changed to an activation state. As described above, when the pieces of the congestion information of the object terminals are counted, the counting may be performed by applying a weighted value.

The electric power control step can make a control to reduce the transmission electric power of the communication module when the electric power control information is in an activation state (S906). For example, the electric power control step may make a control to divide a transmission electric power stage into various stages and divide the electric power control information into various stages so as to obtain transmission electric power which accords with each stage. Otherwise, when the transmission electric power is reduced, the electric power control step can reduce the transmission electric power within a range in which the subject vehicle and the object terminals continuously communicate with each other, using distance information of the object terminals being communicating with the subject vehicle.

As described above, the apparatus and method for controlling vehicle communication according to the present invention can prevent collision and loss of data in an environment in which the number of vehicles and infrastructure devices, which perform V2X communication, increases.

Further, the apparatus and method for controlling vehicle communication according to the present invention can efficiently prevent excessive reception of data units by changing final transmission electric power in consideration of the congestion information of surrounding vehicles as well as a subject vehicle. Further, the apparatus and method for controlling vehicle communication according to the present invention can transmit a congestion preparation index value of the subject vehicle to the surrounding vehicles to reduce transmission electric power of the surrounding vehicles so as to prevent excessive reception of data units of the subject vehicle.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

What is claimed is:

1. An apparatus for controlling vehicle communication, the apparatus comprising:
    a reception unit receiving data units transmitted by each of one or more of object terminals and one or more of pieces of congestion information of the object terminals;
    a congestion degree pre-determination unit changing congestion information of a subject vehicle on the basis of the number of data units received during a predetermined period of time;
    a congestion determination unit changing electric power control information on the basis of the congestion information of the subject vehicle or the congestion information of the object terminals; and
    an electric power control unit controlling transmission electric power of a communication module on the basis of the electric power control information,
    wherein the one or more of the object terminals correspond to a surrounding vehicle or an infrastructure device which performs V2X communication, and
    the congestion information and the electric power control information comprise an index value indicating activation or deactivation.

2. The apparatus of claim 1, further comprising a transmission unit, when one or more of values of the congestion information of the subject vehicle and the electric power control information are changed, transmitting the changed congestion information of the subject vehicle or the changed electric power control information.

3. The apparatus of claim 1, wherein the electric power control unit makes a control to reduce the transmission electric power when the electric power control information corresponds to an activation state.

4. The apparatus of claim 1, wherein the electric power control unit makes a control to decrease the transmission electric power within a range in which communication with the object terminals is maintained when there are the object terminals being communicating with the subject vehicle.

5. An apparatus for controlling vehicle communication, the apparatus comprising:
    a reception unit receiving data units transmitted by each of one or more of object terminals and one or more of pieces of congestion information of the object terminals;
    a congestion degree pre-determination unit changing congestion information of a subject vehicle on the basis of the number of data units received during a predetermined period of time;
    a congestion determination unit changing electric power control information on the basis of the congestion information of the subject vehicle or the congestion information of the object terminals; and
    an electric power control unit controlling transmission electric power of a communication module on the basis of the electric power control information,
    wherein the congestion degree pre-determination unit calculates an average value obtained by averaging the number of data units received in a predetermined time unit over a predetermined period of time or the number of data units received during the predetermined period of time, and when it is determined that the calculated average value or the calculated number of data units is equal to or larger than a predetermined first reference value, changes the congestion information of the subject vehicle to an activation state.

6. An apparatus for controlling vehicle communication, the apparatus comprising:
    a reception unit receiving data units transmitted by each of one or more of object terminals and one or more of pieces of congestion information of the object terminals;
    a congestion degree pre-determination unit changing congestion information of a subject vehicle on the basis of the number of data units received during a predetermined period of time;
    a congestion determination unit changing electric power control information on the basis of the congestion information of the subject vehicle or the congestion information of the object terminals; and
    an electric power control unit controlling transmission electric power of a communication module on the basis of the electric power control information,
    wherein the congestion degree determination unit calculates the number of pieces of the congestion information, which have a value of an activation state, from among pieces of the congestion information of the object terminals, which are received during a predetermined period of time, and when it is determined that the calculated number is equal to or larger than a predetermined second reference value, changing the electric power control information to an activation state.

7. An apparatus for controlling vehicle communication, the apparatus comprising:

a reception unit receiving data units transmitted by each of one or more of object terminals and one or more of pieces of congestion information of the object terminals;

a congestion degree pre-determination unit changing congestion information of a subject vehicle on the basis of the number of data units received during a predetermined period of time;

a congestion determination unit changing electric power control information on the basis of the congestion information of the subject vehicle or the congestion information of the object terminals; and an electric power control unit controlling transmission electric power of a communication module on the basis of the electric power control information, wherein the congestion degree determination unit changes the electric power control information to a deactivation state when the electric power control information corresponds to an activation state and the number of received data units is smaller than a third reference value.

8. An apparatus for controlling vehicle communication, the apparatus comprising:

a reception unit receiving data units transmitted by each of one or more of object terminals and one or more of pieces of congestion information of the object terminals;

a congestion degree pre-determination unit changing congestion information of a subject vehicle on the basis of the number of data units received during a predetermined period of time;

a congestion determination unit changing electric power control information on the basis of the congestion information of the subject vehicle or the congestion information of the object terminals; and an electric power control unit controlling transmission electric power of a communication module on the basis of the electric power control information, wherein the congestion degree pre-determination unit changes the congestion information of the subject vehicle to a deactivation state when the congestion information of the subject vehicle corresponds to an activation state and the number of data units received during the predetermined period of time is smaller than a fourth reference value.

9. The apparatus of claim 8, wherein the electric power control unit makes a control to increase the transmission electric power when the congestion information of the subject vehicle is changed to a deactivation state.

* * * * *